United States Patent
Kwon et al.

(10) Patent No.: US 9,367,894 B2
(45) Date of Patent: Jun. 14, 2016

(54) STRETCHABLE DISPLAY AND METHOD OF CONTROLLING THE SAME

(71) Applicants: Dae-Heon Kwon, Yongin (KR); Jae-Won Choi, Yongin (KR)

(72) Inventors: Dae-Heon Kwon, Yongin (KR); Jae-Won Choi, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 133 days.

(21) Appl. No.: 13/912,478

(22) Filed: Jun. 7, 2013

(65) Prior Publication Data

US 2014/0218408 A1 Aug. 7, 2014

(30) Foreign Application Priority Data

Feb. 1, 2013 (KR) ........................ 10-2013-0011983

(51) Int. Cl.
| | |
|---|---|
| G09G 5/00 | (2006.01) |
| G06T 3/40 | (2006.01) |
| G06F 3/0487 | (2013.01) |
| G06F 1/16 | (2006.01) |
| G06F 3/0346 | (2013.01) |
| H04M 1/02 | (2006.01) |

(52) U.S. Cl.
CPC ................ *G06T 3/40* (2013.01); *G06F 1/1652* (2013.01); *G06F 3/0346* (2013.01); *G06F 3/0487* (2013.01); *G06F 2203/04102* (2013.01); *H04M 1/0266* (2013.01); *H04M 2250/12* (2013.01)

(58) Field of Classification Search
CPC ................................ G06T 3/40; G06F 1/1652
USPC ........................................................... 345/660
See application file for complete search history.

(56) References Cited

U.S. PATENT DOCUMENTS

| | | |
|---|---|---|
| 6,160,540 A | 12/2000 | Fishkin et al. |
| 6,819,304 B2 | 11/2004 | Branson |
| 7,970,443 B2 | 6/2011 | Wong et al. |
| 2003/0160735 A1 | 8/2003 | Lee et al. |
| 2007/0247422 A1 | 10/2007 | Vertegaal et al. |
| 2008/0224948 A1 | 9/2008 | Alberth |
| 2009/0184921 A1 | 7/2009 | Scott et al. |
| 2010/0056223 A1* | 3/2010 | Choi et al. ................... 455/566 |
| 2010/0060604 A1 | 3/2010 | Zwart et al. |
| 2010/0164888 A1 | 7/2010 | Okumura et al. |
| 2011/0267294 A1 | 11/2011 | Kildal |
| 2014/0126133 A1* | 5/2014 | Griffin et al. ............ 361/679.27 |

FOREIGN PATENT DOCUMENTS

| | | |
|---|---|---|
| CN | 101330679 A | 12/2008 |
| EP | 0929027 A2 | 7/1999 |

(Continued)

OTHER PUBLICATIONS

European Search Report in EP 13182066.4-1960, dated Feb. 11, 2014 (Kwon, et al.).

*Primary Examiner* — Peter Hoang
(74) *Attorney, Agent, or Firm* — Lee & Morse, P.C.

(57) ABSTRACT

A method of controlling a stretchable display including a stretchable substrate, stretchable in at least one direction, and a display unit that is on the stretchable substrate and displays an image, the method including obtaining stretch information of the stretchable substrate using at least two acceleration sensors provided on edges of the stretchable substrate, predicting a shape change of the display unit on the basis of the stretch information, and controlling the display unit on the basis of the shape change.

22 Claims, 7 Drawing Sheets

(56) References Cited

FOREIGN PATENT DOCUMENTS

| EP | 0929027 | A3 | 5/2000 |
| EP | 2508960 | A2 | 10/2012 |
| EP | 2508960 | A3 | 7/2013 |
| EP | 2508960 | A9 | 8/2013 |
| KR | 10-2006-0032489 | A | 4/2006 |

* cited by examiner

STRETCHABLE DISPLAY AND METHOD OF CONTROLLING THE SAME

CROSS-REFERENCE TO RELATED APPLICATION

This application claims priority to and the benefit of Korean Patent Application No. 10-2013-0011983, filed on Feb. 1, 2013, in the Korean Intellectual Property Office, and entitled: "STRETCHABLE DISPLAY AND METHOD OF CONTROLLING THE SAME," which is incorporated by reference herein in its entirety.

BACKGROUND

1. Field

Embodiments relate to a stretchable display and a method of controlling the same.

2. Description of the Related Art

Displays that are modifiable at their time of use, for example, capable of being folded or rolled, or stretchable in at least one direction, are being researched.

SUMMARY

Embodiments are directed to a method of controlling a stretchable display including a stretchable substrate, stretchable in at least one direction, and a display unit that is on the stretchable substrate and displays an image, the method including obtaining stretch information of the stretchable substrate using at least two acceleration sensors provided on edges of the stretchable substrate, predicting a shape change of the display unit on the basis of the stretch information, and controlling the display unit on the basis of the shape change.

The acceleration sensors may be provided at at least two corners of corners formed by adjacent edges of the stretchable substrate meeting each other.

The obtaining of the stretch information may include obtaining each acceleration of the at least two corners using the acceleration sensors, obtaining each moving distance of the at least two corners using the accelerations, and obtaining the stretch information of the stretchable substrate using each of the moving distances of the at least two corners.

The at least two corners may be adjacent to each other, and an extension line connecting the at least two corners may extend in a first direction, and the obtaining of the stretch information may include obtaining the stretch information in the first direction.

The at least two corners may not be adjacent to each other, and an extension line connecting the at least two corners may extend in a third direction, and the obtaining of the stretch information may include obtaining the stretch information in the third direction.

The obtaining of the stretch information may include obtaining the stretch information of the stretchable substrate using acceleration sensors respectively provided at at least four corners.

The edges may lie in a first direction or a second direction, and the obtaining of the stretch information may include obtaining stretch information candidates in the first direction or in the second direction of the stretchable substrate using two pairs of the acceleration sensors which are adjacent to each other from among the acceleration sensors, and obtaining the stretch information of the stretchable substrate using the stretch information candidates.

An extension line connecting two corners, which are not adjacent to each other from among the four corners, may extend in a third direction or in a fourth direction, and the obtaining of the stretch information may include obtaining stretch information candidates in a third direction or in a fourth direction of the stretchable substrate using two pairs of the acceleration sensors, which are not adjacent to each other from among the acceleration sensors, and obtaining the stretch information of the stretchable substrate using the stretch information candidates.

The predicting may include using a look-up table in which the stretch information and a shape of the display unit are mapped to each other.

Each acceleration sensor may obtain three perpendicular axis accelerations of the acceleration sensor, and the obtaining of the stretch information may include obtaining the stretch information of the stretchable substrate using the accelerations.

The controlling may include controlling at least one characteristic of a size, a luminance, and a resolution of an image displayed on the display unit.

Embodiments are also directed to a stretchable display, including a stretchable substrate capable of being stretched in at least one direction, at least two acceleration sensors provided on edges of the stretchable substrate, a display unit on the stretchable substrate, the display unit capable of being stretched in at least one direction, and displaying an image, and a controller to control the stretchable display using stretch information of the stretchable substrate obtained from the at least two acceleration sensors.

The controller may include a stretch information obtaining unit for obtaining the stretch information of the stretchable substrate using the at least two acceleration sensors, a shape change prediction unit for predicting a shape change of the display unit on the basis of the stretch information, and a display controller for controlling the display unit on the basis of the shape change.

The acceleration sensors may be provided at at least two corners from among corners formed by adjacent edges of the stretchable substrate.

The stretchable display may further include an acceleration obtaining unit for obtaining each acceleration of the at least two corners using the at least two acceleration sensors, and a moving distance obtaining unit for obtaining each moving distance of the at least two corners using the accelerations, and the stretch information obtaining unit may obtain the stretch information of the stretchable substrate using each of the moving distances of the at least two corners.

The at least two corners may be adjacent to each other, and an extension line connecting the at least two corners may extend in a first direction, and the stretch information obtaining unit may obtain the stretch information in the first direction.

The at least two corners may not be adjacent to each other, and an extension line connecting the at least two corners may extend in a third direction, and the stretch information obtaining unit obtains the stretch information in the third direction.

The acceleration sensors may be provided at at least four corners from among the corners, and the stretch information obtaining unit may obtain the stretch information of the stretchable substrate using the acceleration sensors provided at the at least four corners.

The edges may be disposed in a first direction or a second direction, and the stretch information obtaining unit may obtain stretch information candidates in the first direction or in the second direction of the stretchable substrate using two respective pairs of the acceleration sensors, which are adjacent to each other from among the acceleration sensors, and obtain the stretch information of the stretchable substrate using the stretch information candidates.

An extension line connecting two corners, which are not adjacent to each other from among the four corners, may lie in a third direction or in a fourth direction, and the stretch information obtaining unit may obtain stretch information candidates in the third direction or in the fourth direction of the stretchable substrate using two respective pairs of the acceleration sensors, which are not adjacent to each other among the acceleration sensors, and obtain the stretch information of the stretchable substrate using the stretch information candidates.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

The examples or example terms (for example, etc.) used herein are to merely describe embodiments in detail and are not intended to be limiting. Also, those of skill in the art will readily appreciate that many alterations, combinations and modifications, may be made according to design conditions and factors within the scope of the appended claims and their equivalents. For simplicity of description, other functional aspects of related known technologies may be omitted.

It will be understood that, although the terms first, second, third, etc., may be used herein to describe various elements or components, these elements or components should not be limited by these terms. These terms are only used to distinguish one element or component from another element or component.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in conjunction with the accompanying drawings.

Figure 1A:
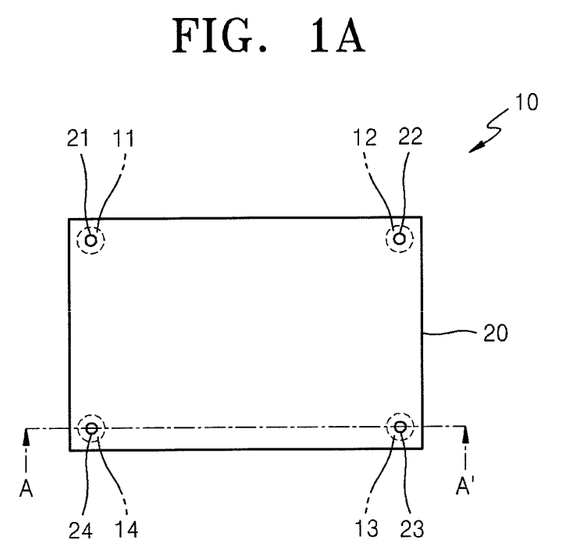
FIG. 1A schematically illustrates a stretchable display according to an example embodiment.

FIG. 1A schematically illustrates a stretchable display apparatus 10 according to an example embodiment.

In the example embodiment shown in FIG. 1A, the stretchable display 10 may include a stretchable substrate 20 stretched in at least one direction, acceleration sensors 21, 22, 23, and 24 provided on edges of the stretchable substrate 20, a display unit 30 which is on the stretchable substrate 20, is stretched in at least one direction, and displays an image, and a controller (not shown) for controlling the stretchable display 10 using stretch information of the stretchable substrate 20 obtained from the acceleration sensors 21, 22, 23, and 24.

The stretchable substrate 20 may be formed of a polydimethylsiloxane (PDMS) material having excellent stretching capabilities, and is easily stretched when a body thereof is pulled.

The acceleration sensors 21, 22, 23, and 24 may be provided on corners 11, 12, 13, and 14 where adjacent edges of the stretchable substrate 20 meet.

The acceleration sensors 21, 22, 23, and 24 detect acceleration of an object or strength of an impact to the object when the acceleration sensors 21, 22, 23, and 24 are attached to the object and the object moves. using an acceleration sensor, a movement of an object may be accurately detected. The acceleration sensor may detect acceleration of an object, to which the acceleration sensor is attached, with respect to three perpendicular axes.

The acceleration sensor may detect acceleration of an object by unit time. using the acceleration measured by the acceleration sensor, a velocity of the object according to time may be obtained, and a moving distance according to time may be also obtained using the velocity of the object. Accordingly, the moving distance according to time may be obtained using the acceleration sensor.

Figure 1B:
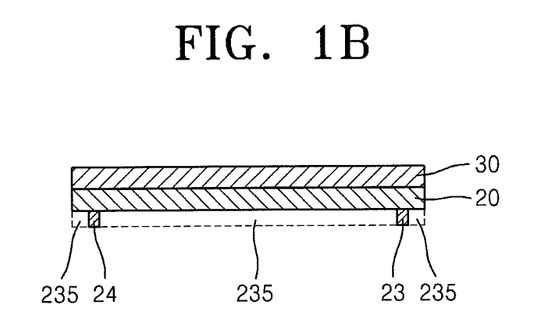
FIG. 1B illustrates a cross-sectional view taken along a line A-A' of FIG. 1.

FIG. 1B is a cross-sectional view viewed from A-A' of FIG. 1A.

Referring to FIG. 1B, a stretchable display 10, which may be stretched in at least one direction, may include a stretchable substrate 20, acceleration sensors 23 and 24 provided on edges of the stretchable substrate 20, and a display unit 30 formed on the stretchable substrate 20. Referring to FIG. 1B, the acceleration sensors 23 and 24 may be attached under the stretchable substrate 20. In a space between the acceleration sensors 23 and 24, a stretchable support unit 235 may be further included, but it is not limited thereto. The stretchable support unit 235 may also not be included.

The illustrated positions of the acceleration sensors 23 and 24 are merely an example, and are not limited thereto. The acceleration sensors 23 and 24 may be formed at an upper end of the display unit 30, or interposed between the display unit 30 and the stretchable substrate 20.

Figure 2:
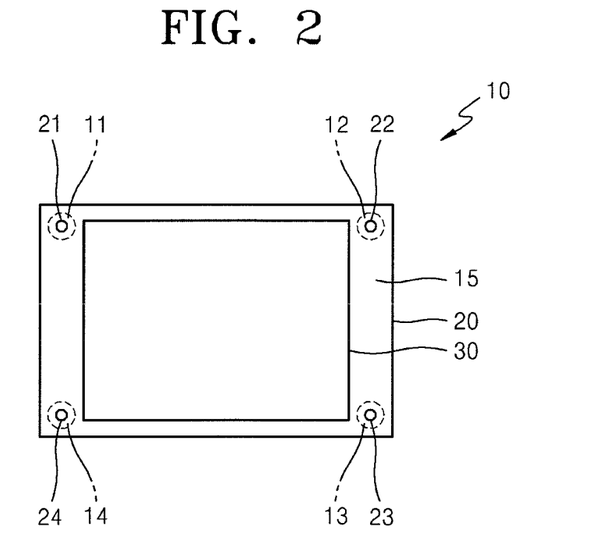
FIG. 2 schematically illustrates a stretchable display according to another example embodiment.

FIG. 2 illustrates schematically a stretchable display 10 according to another example embodiment.

In the example embodiment shown in FIG. 2, the stretchable display 10 may further include a separate non-display unit 15 which does not display an image, which is different from FIG. 1A. The acceleration sensors 21, 22, 23, and 24 may be formed on the non-display unit 15 on the stretchable substrate 20. For example, the acceleration sensors 21, 22, 23, and 24 may be attached to an upper end or a lower end of the non-display unit 15, or may be embedded in a region of the non-display unit 15 on the stretchable substrate 20.

In FIG. 2, a case where the non-display unit 15 is formed at all four portions adjacent to four corners of the stretchable display apparatus 10 is exemplified, but positions of the non-display unit 15 are not limited thereto. For example, the non-display unit 15 may be formed at two portions adjacent to two edges opposite each other in the stretchable display 10, and the acceleration sensors 21, 22, 23, and 24 may be formed on a region of the non-display unit 15, which is formed at two portions of the stretchable display 10 that are opposite each other.

Figure 3A:
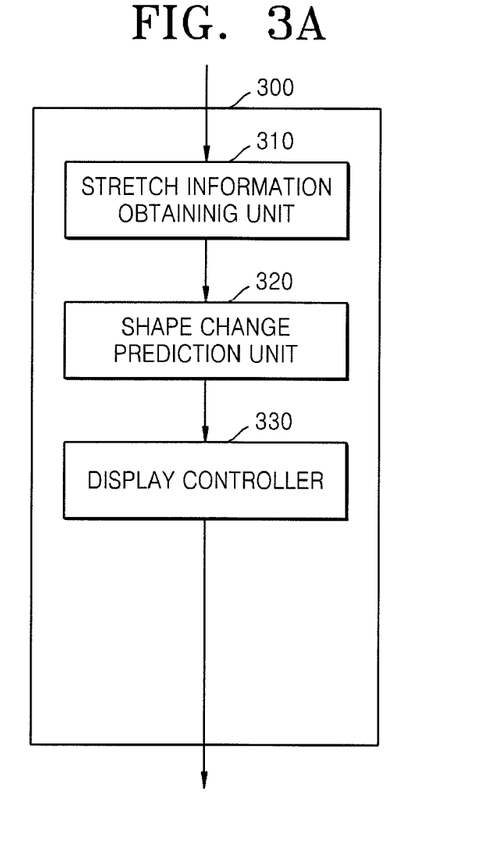
FIGS. 3A and 3B illustrate block diagrams of a configuration of a controller controlling a stretchable display, according to an example embodiment.
Figure 3B:
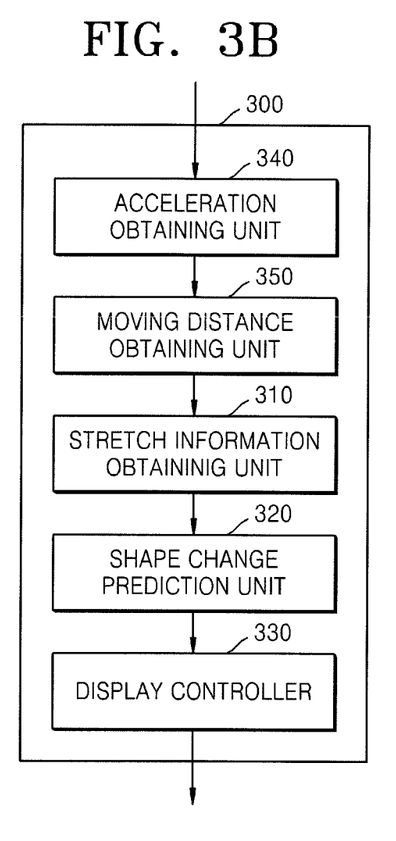

FIGS. 3A and 3B are block diagrams of a controller 300 controlling a stretchable display 10, according to an example embodiment.

In the example embodiment shown in FIG. 3A, the stretchable display 10 may include a stretch information obtaining unit 310, a shape change prediction unit 320, and a display controller 330.

In the example embodiment of FIG. 3A, the stretch information obtaining unit 310 may obtain stretch information of the stretchable substrate 20 using acceleration sensors. The stretch information may be information determining how much the stretchable substrate 20 is stretched. For example, the stretch information of the stretchable substrate 20, which is stretchable in at least one direction, may be a stretch distance or a moving distance in at least one direction of the stretchable substrate 20. The stretch information of the stretchable substrate 20, which is stretchable in at least two directions, may be each a stretch distance or a moving distance in at least two directions of the stretchable substrate 20.

The shape change prediction unit 320 may predict a shape change of the display unit 30 on the basis of the stretch information obtained by the stretch information obtaining unit 310. Since the display unit 30 may be formed on the stretchable substrate 20, which is stretchable in at least one direction, and the display unit 30 is also stretchable in at least one direction, the display unit 30 may be stretched according to stretch of the stretchable substrate 20. Accordingly, the shape change prediction unit 320 may predict a shape change of the display unit 30, which is formed on the stretchable substrate 20, on the basis of the stretch information obtained by the stretch information obtaining unit 310.

For example, the shape change prediction unit 320 may predict a change of a shape of the display unit 30 according to the amount of stretch of the display unit 30 in proportion to the amount of stretch of the stretchable substrate 20. Accordingly, the shape change prediction unit 320 may calculate the shape of the display unit 30 from the stretch information of the stretchable substrate 20 according to a preset calculation method.

In another implementation, the shape change prediction unit 320 may use a look-up table where the stretch information of the stretchable substrate 20 and the shape of the display unit 30 are mapped to each other. The look-up table may be one where each moving distance of at least two acceleration sensors is mapped to a shape of the display unit 30. The look-up table may be created using the stretch information of the stretchable substrate 20 and shape information of the display unit 30, which may be obtained through previous experiments.

The display controller 330 may control the display unit 30 on the basis of the shape change of the display unit 30, which is predicted by the shape change prediction unit 320. For example, the display controller 330 may control at least one characteristic of a size, a luminance, and a resolution of an image displayed by the display unit 30 on the basis of the shape change of the display unit 30. However, the example embodiment where the display controller 330 controls the display unit 30 is not limited thereto. The display controller 330 may control the display unit 30 to display and provide a user with a user interface (UI) and/or a user experience design (UX) corresponding to the shape change of the display unit 30.

Referring to FIG. 3B, the controller 300 may further include an acceleration obtaining unit 340 and a moving distance obtaining unit 350.

The acceleration obtaining unit 340 may obtain accelerations of the edges of the stretchable substrate 20 using acceleration sensors. The acceleration obtaining unit 340 may obtain the accelerations from an analog-to-digital converter in the acceleration sensor.

The moving distance obtaining unit 350 may obtain moving distances of the edges of the stretchable substrate 20 using the accelerations obtained by the acceleration obtaining unit 340. The stretch information obtaining unit 310 may obtain the stretch information of the stretchable substrate 30 using the moving distances obtained by the moving distance obtaining unit 350.

For example, the acceleration obtaining unit 340 may obtain accelerations of at least two corners of the stretchable substrates 20. The moving distance obtaining unit 350 may obtain each moving distance of the at least two corners using the accelerations obtained by the acceleration obtaining unit 340. The stretch information obtaining unit 310 may obtain the stretch information of the stretchable substrate 20 using each moving distance of the at least two corners obtained by the moving distance obtaining unit 350.

As another example, the acceleration obtaining unit 340 may obtain accelerations from acceleration sensors whose sensed acceleration values are variable among the acceleration sensors positioned in the four corners of the stretchable substrate 20.

Hereinafter, various example embodiments for obtaining the stretch information will be described in relation to FIGS. 4 to 6.

Figure 4:
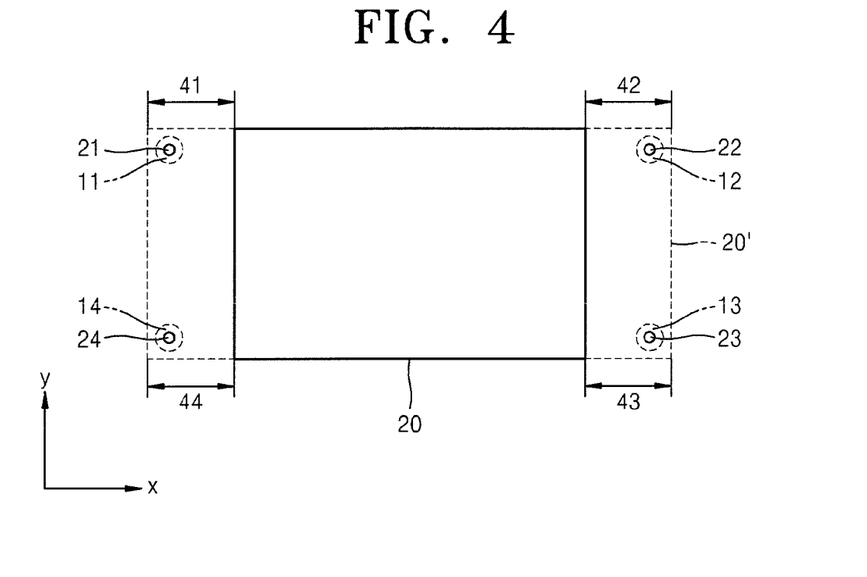
FIG. 4 illustrates a scheme for obtaining stretch information in an x-axis direction of a stretchable substrate according to an example embodiment.

FIG. 4 illustrates a method of obtaining the stretch information in an x-axis direction of the stretchable substrate 20, according to an example embodiment. The stretchable substrate 20 before being stretched is indicated with a solid line and the stretchable substrate 20' in a stretched state is indicated with a dashed line. The edges of the stretchable substrate 20 are positioned in x-axis and y-axis directions.

As described above, the acceleration sensors 21, 22, 23, and 24 may detect accelerations with respect to three perpendicular axes, and thus the acceleration obtaining unit 340 may detect x-axis and y-axis directional accelerations of the corners 11, 12, 13, and 14 using the acceleration sensors 21, 21, 23, and 24. Accordingly, the moving distance obtaining unit 350 may obtain moving distances in x-axis and y-axis directions of the corners 11, 12, 13, and 14. The moving distances may include positive or negative directivity.

Referring to FIG. 4, the acceleration obtaining unit 340 in FIG. 3B may obtain accelerations of adjacent corners 11 and 12 using adjacent acceleration sensors 21 and 22. Referring to FIG. 4, an extension line of the adjacent corners 11 and 12 extends in the x-axis direction. The moving distance obtaining unit 350 may obtain moving distances 41 and 42 in the x-axis direction using the accelerations of the corners 11 and 12, which are obtained by the acceleration obtaining unit 340. The stretch information obtaining unit 310 may obtain the x-axis directional stretch information of the stretchable substrate 20 using the moving distance 41 and 42 of the corners 11 and 12, which are obtained by the moving distance obtaining unit 350.

Here, the stretch information of the stretchable substrate 20 indicates an amount of stretch of the stretchable substrate 20, and may be indicated as a stretch distance. However, a specific way to indicate the degree of stretch is not limited thereto. The amount of stretch may be indicated as a size of the stretchable substrate 20 after being stretched.

For example, the stretch information obtaining unit 310 may obtain the stretch information as the stretch distance of the stretchable substrate 20 using the moving distances 41 and 42 of the corners 11 and 12. For example of FIG. 4, the stretch information of the stretchable substrate 20 may be a sum of the moving distances 41 and 42.

Although the acceleration sensors 21 and 22, and the corners 11 and 12 are exemplified so far, the same may be also applied to adjacent acceleration sensors 23 and 24 and adjacent corners 13 and 14. Thus, the acceleration obtaining unit 340 may obtain x-axis directional acceleration of the corners 13 and 14 using the acceleration sensors 23 and 24, the moving distance obtaining unit 350 may obtain a positive x-axis directional moving distance 43 of the corner 13 and a negative x-axis directional moving distance 44 of the corner 14 using the acceleration. The stretch information obtaining unit 310 may obtain a sum of the moving distances 43 and 44 as the stretch information of the stretchable substrate 20.

According to another example embodiment, the stretch information obtaining unit 310 may obtain the stretch information of the stretchable substrate 20 using all the acceleration sensors 21, 22, 23, and 24 provided at the four corners 11, 12, 13, and 14.

For example, in FIG. 4, the acceleration obtaining unit 340 may obtain the acceleration of each of the corners 11, 12, 13, and 14 using the acceleration sensors 21, 22, 23, and 24 provided at the four corners 11, 12, 13, and 14, the moving distance obtaining unit 350 may obtain the moving distances 41, 42, 43, and 44 in the x-axis direction of the corners 11, 12, 13, and 14 using the accelerations, and the stretch information obtaining unit 310 may obtain the x-axis directional stretch information of the stretchable substrate 20 using the moving distances 41, 42, 43, and 44.

In an example embodiment, the stretch information obtaining unit 310 obtains a first stretch distance of the stretchable substrate 20, which is a sum of the moving distance 41 and the moving distance 42, as a stretch information candidate, obtains a second stretch distance of the stretchable substrate 20, which is a sum of the moving distance 43 and the moving distance 44, as another stretch information candidate, and obtains an average of the first and second stretch distances which are the stretch information candidates as the x-axis stretch information of the stretchable substrate 20. The average may be obtained by the arithmetic average or the geometric average, but is not limited thereto.

Figure 5:
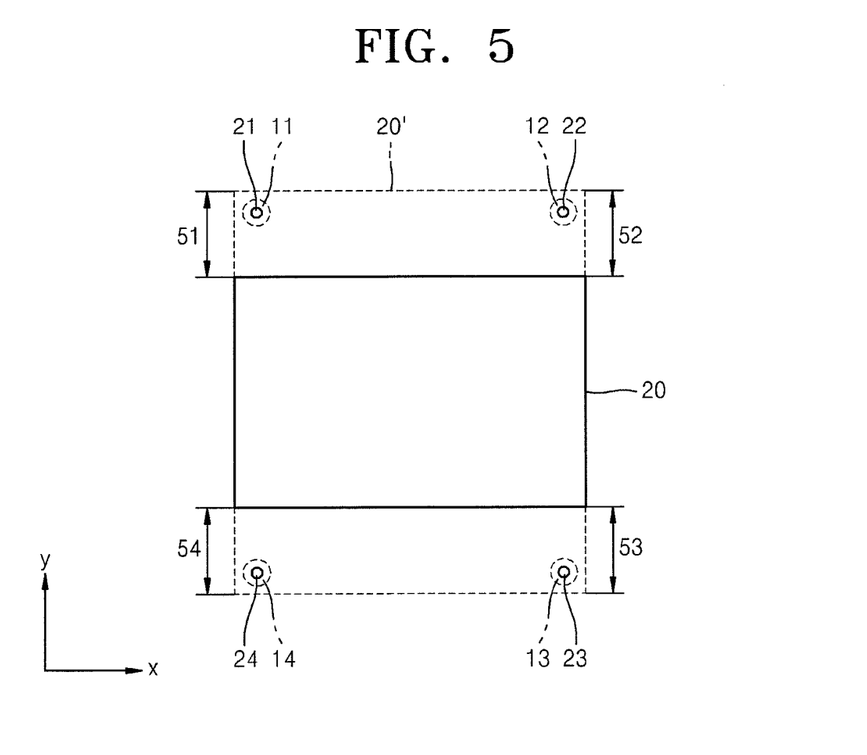
FIG. 5 illustrates a scheme for obtaining stretch information in a y-axis direction of a stretchable substrate, according to an example embodiment.

FIG. 5 illustrates a method of obtaining stretch information in a y-axis direction of the stretchable substrate 20 according to another example embodiment. In FIG. 5, the stretchable substrate 20 before being stretched is indicated with a solid line and the stretchable substrate 20' in a stretched state is indicated with a dashed line.

In the example embodiment shown in FIG. 5, the acceleration obtaining unit 340 in FIG. 3B may obtain acceleration of adjacent corners 11 and 14 using adjacent acceleration sensors 21 and 24. Referring to FIG. 5, an extension line of adjacent corners 11 and 14 extends in the y-axis direction. The moving distance obtaining unit 350 may obtain moving distances 51 and 54 in the y-axis direction using the accelerations of the corners 11 and 14, which are obtained by the acceleration obtaining unit 340.

The stretch information obtaining unit 310 may obtain a distance that is stretched in the y-axis direction as the y-axis directional stretch information of the stretchable substrate 20 using moving distances 51 and 54 of the corners 11 and 14, which are obtained by the moving distance obtaining unit 350. For example, in FIG. 5, the distance that the stretchable substrate 20 is stretched in the y-axis may be a sum of the moving distances 51 and 54.

Although the acceleration sensors 21 and 24, and the corners 11 and 14 are exemplified so far, the same way may be also applied to adjacent acceleration sensors 22 and 23 and adjacent corners 12 and 13. Thus, the acceleration obtaining unit 340 may obtain a y-axis directional acceleration of the corners 12 and 13 using the acceleration sensors 22 and 23, and the moving distance obtaining unit 350 may obtain a positive y-axis directional moving distance 52 of the corner 13 and a negative y-axis directional moving distance 53 of the corner 13 using the y-axis directional acceleration. The stretch information obtaining unit 310 may obtain a sum of the moving distances 52 and 53 as the stretch information of the stretchable substrate 20.

According to another example embodiment, the acceleration obtaining unit 340 may obtain an acceleration of each of the corners 11, 12, 13, and 14 using the acceleration sensors 21, 22, 23, and 24 provided at the four corners 11, 12, 13, and 14, the moving distance obtaining unit 350 may obtain the moving distances 51, 52, 53, and 54 in the y-axis direction of the corners 11, 12, 13, and 14 using the accelerations, and the stretch information obtaining unit 310 may obtain the y-axis directional stretch information of the stretchable substrate 20 using the moving distances 51, 52, 53, and 54.

In an example embodiment, the stretch information obtaining unit 310 obtains a first stretch distance of the stretchable substrate 20, which is a sum of the moving distance 51 and the moving distance 54, as a stretch information candidate, obtains a second stretch distance of the stretchable substrate 20, which is a sum of the moving distance 52 and the moving distance 53, as another stretch information candidate, and obtains an average of the first and second distances which are the stretch information candidates as the y-axis stretch information of the stretchable substrate 20. The average may be obtained by calculating the arithmetic average or the geometric average, but is not limited thereto.

Figure 6:
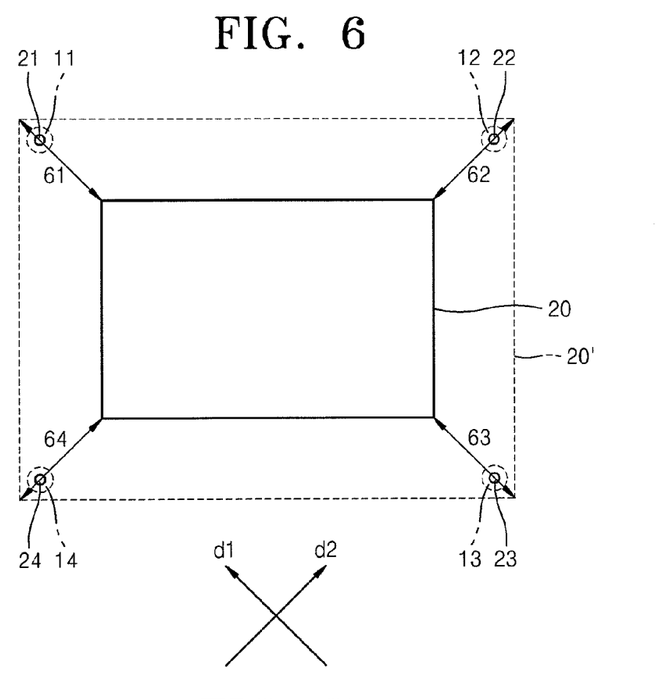
FIG. 6 illustrates a scheme for obtaining stretch information in a diagonal direction of a stretchable substrate, according to an example embodiment.

FIG. 6 illustrates a method of obtaining stretch information in a diagonal direction of the stretchable substrate 20, according to another example embodiment. In FIG. 6, the stretchable substrate 20 before being stretched is indicated with a solid line and the stretchable substrate 20' in a stretched state is indicated with a dashed line.

In the example embodiment shown in FIG. 6, the acceleration obtaining unit 340 of FIG. 3B may obtain accelerations of non-adjacent corners 11 and 13 using non-adjacent acceleration sensors 21 and 23. Referring to FIG. 6, an extension line of the non-adjacent corners 11 and 13 extends in a diagonal direction d1, and an extension line of non-adjacent corners 12 and 14 extends in another diagonal direction d2.

The moving distance obtaining unit 350 may obtain distances 61 and 63 in the diagonal direction d1 of the corners 11 and 13 using the accelerations of the corners 11 and 13, which are obtained by the acceleration obtaining unit 340. The stretch information obtaining unit 310 may obtain stretch information in the diagonal direction d1 of the stretchable substrate 20 using moving distances 61 and 63 of the corners 11 and 13, which are obtained by the moving distance obtaining unit 350.

For example, the stretch information obtaining unit 310 may obtain as d1 directional stretch information of the stretchable substrate 20, a sum of the moving distances 61 and 63, which are distances that the stretchable substrate 20 are stretched in the diagonal direction d1, using the moving distances 61 and 63 of the corners 11 and 13.

Although the acceleration sensors 21 and 23, and the corners 11 and 13 are exemplified so far, the same may be also applied to non-adjacent acceleration sensors 22 and 24 and non-adjacent corners 12 and 14.

Thus, the acceleration obtaining unit 340 may obtain d2 directional acceleration of the corners 12 and 14 using the acceleration sensors 22 and 24, and the moving distance obtaining unit 350 may obtain a positive d2 directional moving distance 62 of the corner 12 and a negative d2 directional moving distance 64 of the corner 14 using the acceleration. The stretch information obtaining unit 310 may obtain a sum of the moving distances 62 and 64 as the stretch information of the stretchable substrate 20.

According to another example embodiment, the acceleration obtaining unit 340 may obtain acceleration of each of the corners 11, 12, 13, and 14 using the acceleration sensors 21, 22, 23, and 24 provided at the four corners 11, 12, 13, and 14, the moving distance obtaining unit 350 may obtain the moving distances 61, 62, 63, and 64 in d1 or d2 direction of the corners 11, 12, 13, and 14 using the accelerations, and the stretch information obtaining unit 310 may obtain the d1 or d2 directional stretch information of the stretchable substrate 20 using the moving distances 61, 62, 63, and 64.

In an example embodiment, the stretch information obtaining unit 310 may obtain stretch information candidates in the d1 or d2 direction of the stretchable substrate 20 using each pair of non-adjacent acceleration sensors (21, 23) and (22, 24), and obtain the stretch information of the stretchable substrate 20 using the stretch information candidates.

In an example embodiment, the stretch information obtaining unit 310 obtains as a stretch information candidate a first stretch distance in the d1 direction of the stretchable substrate 20, which is a sum of the moving distance 61 and the moving distance 63, obtains as another stretch information candidate a second stretch distance in the d2 direction of the stretchable substrate 20, which is a sum of the moving distance 62 and the moving distance 64, and obtains an average of the first and second distances which are the stretch information candidates as the diagonal directional stretch information of the stretchable substrate 20. The average may be obtained by calculating the arithmetic average or the geometric average, but is not limited thereto.

Figure 7A:
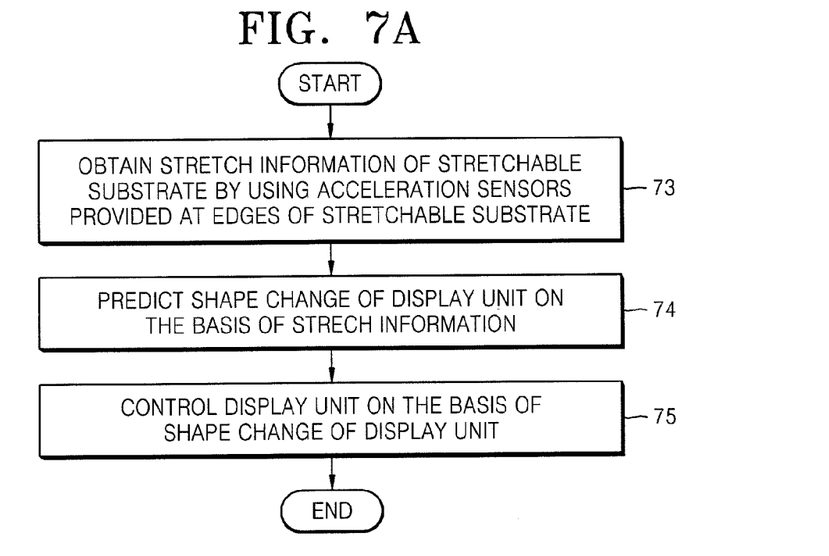
FIGS. 7A and 7B illustrate flowcharts of a method of controlling a stretchable display, according to an example embodiment.
Figure 7B:
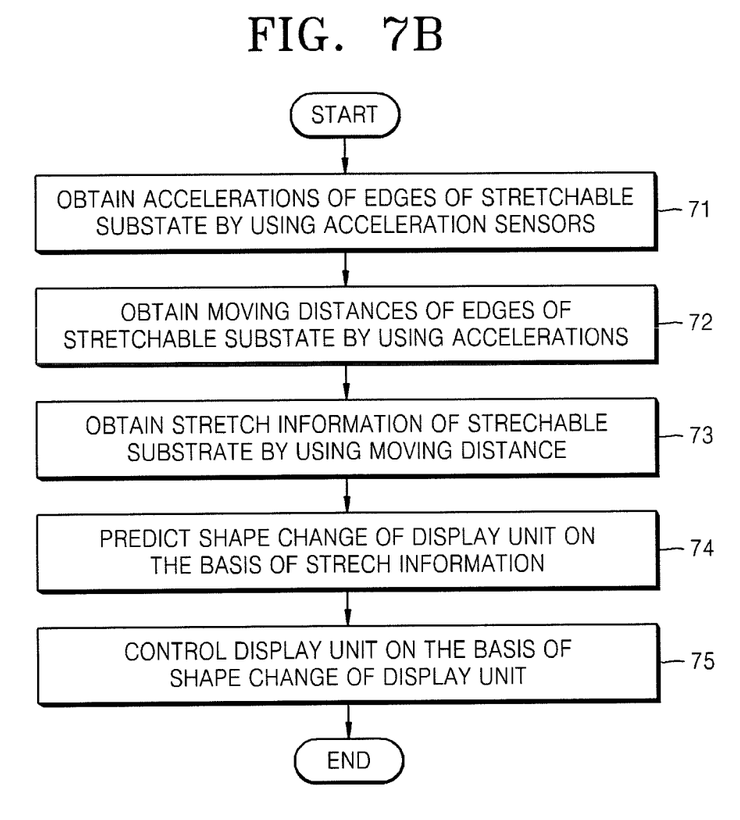

FIGS. 7A and 7B are flow charts of a method of controlling the stretchable display 10 according to an example embodiment. The stretchable display 10 may include a stretchable substrate 20 stretched in at least one direction and a display unit 30, which is formed on the stretchable substrate 20 and displays an image. The stretchable display 10 may further include an acceleration sensor. The acceleration sensor may obtain three perpendicular axis accelerations.

Referring to FIG. 7A, in operation 73, the stretch information obtaining unit 310 may obtain the stretch information of the stretchable substrate 10 using the acceleration sensors 21, 22, 23, and 24 provided at at least two corners from among four corners 11, 12, 13, and 14 formed by adjacent edges of the stretchable substrate 20 meeting each other.

At this time, at least two corners may be adjacent, and their extension line may extend in a first direction or in a second direction. In operation 73, the stretch information obtaining unit 310 may obtain the first directional or the second directional stretch information of the stretchable substrate 20.

In another implementation, at least two corners may not be adjacent, and their extension line may extend in a third direction or a fourth direction. In operation 73, the stretch information obtaining unit 310 may obtain the third directional or the fourth directional stretch information of the stretchable substrate 20.

In another implementation, in operation 73, the stretch information obtaining unit 310 may obtain the stretch information of the stretchable substrate 20 using at least four acceleration sensors 21, 22, 23, and 24 respectively provided at the at least four corners 11, 12, 13, and 14. For example, the stretch information obtaining unit 310 may obtain stretch information candidates in first and second directions of the stretchable substrate 20 using two respective pairs of acceleration sensors, which are adjacent to each other, and obtain the stretch information of the stretchable substrate 20 using the stretch information candidates. In another implementation, the stretch information obtaining unit 310 may obtain stretch information candidates in third and fourth directions of the stretchable substrate 20 using two respective pairs of acceleration sensors, which are not adjacent to each other, and obtain the stretch information of the stretchable substrate 20 using the stretch information candidates.

In operation 74, the shape change prediction unit 320 may predict a shape change of the display unit 30 on the basis of the stretch information obtained in operation 73. In operation 74, the shape change prediction unit 320 may use a look-up table where the stretch information and a shape of the display unit 30 are mapped to each other.

In operation 75, the display controller 330 may control the display unit 30 on the basis of the predicted shape change. For example, in operation 75, the display controller 330 may control at least one characteristic of a size, a luminance, and a resolution of an image displayed by the display unit 30.

Referring to FIG. 7B, the method of controlling the stretchable display unit 10 according to an example embodiment may further include operations 71 and 72.

Referring to FIG. 7B, in operation 71, the acceleration obtaining unit 340 may obtain accelerations of at least two corners from among the corners 11, 12, 13, and 14 using the acceleration sensors 21, 22, 23, and 24. In operation 72, the moving distance obtaining unit 350 may obtain each moving distance of the at least two corners from among the corners 11, 12, 13, and 14 using the accelerations obtained in operation 71. In operation 73, the stretch information obtaining unit 310 may obtain the stretch information of the stretchable substrate 20 using each moving distance of the at least two corners, which are obtained in operation 72.

By way of summation and review, as display technology develops, displays that are modifiable at their time of use, for example, capable of being folded or rolled, or stretchable in at least one direction, are being researched. These displays may be modifiable to be of various shapes. There is an interest in large size displays modifiable at their time of use and small size displays for portable devices. The modifiable displays may be modified to be a preset shape, and also may be diversely modified in response to a user's needs or according to situations in which a display is used. Inconvenience at the time of use may occur when a display region of a display is fixed. Thus, it may be desirable to detect a modified shape of the display and control the display region of the display.

As described above, embodiments relate to a stretchable display including an acceleration sensor and a method of controlling the stretchable display apparatus using the acceleration sensor. Embodiments may provide a stretchable display and a method of controlling the same. Embodiment may also provide a method of detecting stretching of a stretchable display using the stretchable display and an acceleration sensor.

According to embodiments, by controlling a stretchable display using acceleration sensors, a changed shape of the stretchable display having a variable shape may be detected, and a screen suitable for the changed shape may be displayed on a display unit. According to embodiments, by detecting stretching of a stretchable display using an acceleration sensor and controlling the stretchable display on the basis of the detected stretching, a screen suitable for the stretched display shape may be provided to a user.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of controlling a stretchable display including a stretchable substrate, stretchable in at least one direction, and a display unit that is on the stretchable substrate and displays an image, the method comprising:
   obtaining stretch information of the stretchable substrate using a sum of moving distances of at least two acceleration sensors in a same plane based on sensing information received from at least two acceleration sensors provided on edges of the stretchable substrate;
   predicting a shape change of the display unit on the basis of the stretch information; and
   controlling the image displayed by the display unit on the basis of the shape change.

2. The method as claimed in claim 1, wherein the acceleration sensors are provided at at least two corners of corners formed by adjacent edges of the stretchable substrate meeting each other.

3. The method as claimed in claim 2, wherein the obtaining of the stretch information includes:
   obtaining each acceleration of the at least two corners using the acceleration sensors,
   obtaining each moving distance of the at least two corners using the accelerations, and
   obtaining the stretch information of the stretchable substrate using each of the moving distances of the at least two corners.

4. The method as claimed in claim 2, wherein:
   the at least two corners are adjacent to each other, and an extension line connecting the at least two corners extends in a first direction, and
   the obtaining of the stretch information includes obtaining the stretch information in the first direction.

5. The method as claimed in claim 2, wherein:
   the at least two corners are not adjacent to each other, and an extension line connecting the at least two corners extends in a third direction, and
   the obtaining of the stretch information includes obtaining the stretch information in the third direction.

6. The method as claimed in claim 2, wherein the obtaining of the stretch information includes obtaining the stretch information of the stretchable substrate using acceleration sensors respectively provided at at least four corners.

7. The method as claimed in claim 6, wherein the edges lie in a first direction or a second direction, and wherein the obtaining of the stretch information includes:
   obtaining stretch information candidates in the first direction or in the second direction of the stretchable substrate using two pairs of the acceleration sensors which are adjacent to each other from among the acceleration sensors, and
   obtaining the stretch information of the stretchable substrate using the stretch information candidates.

8. The method as claimed in claim 6, wherein an extension line connecting two corners, which are not adjacent to each other from among the four corners, extends in a third direction or in a fourth direction, and wherein the obtaining of the stretch information includes:
   obtaining stretch information candidates in a third direction or in a fourth direction of the stretchable substrate using two pairs of the acceleration sensors, which are not adjacent to each other from among the acceleration sensors, and
   obtaining the stretch information of the stretchable substrate using the stretch information candidates.

9. The method as claimed in claim 1, wherein the predicting includes using a look-up table in which the stretch information and a shape of the display unit are mapped to each other.

10. The method as claimed in claim 1, wherein each acceleration sensor obtains three perpendicular axis accelerations of the acceleration sensor, and the obtaining of the stretch information includes obtaining the stretch information of the stretchable substrate using the accelerations.

11. The method as claimed in claim 1, wherein the controlling includes controlling at least one characteristic of a size, a luminance, and a resolution of an image displayed by the display unit.

12. A stretchable display, comprising:
   a stretchable substrate capable of being stretched in at least one direction;
   at least two acceleration sensors provided on edges of the stretchable substrate;
   a display unit on the stretchable substrate, the display unit capable of being stretched in at least one direction, and displaying an image; and
   a controller to control the image displayed by the display unit using stretch information of the stretchable substrate obtained based on a sum of moving distances of the at least two acceleration sensors in a same plane.

13. The stretchable display as claimed in claim 12, wherein the controller includes:
   a stretch information obtaining unit for obtaining the stretch information of the stretchable substrate using the at least two acceleration sensors,
   a shape change prediction unit for predicting a shape change of the display unit on the basis of the stretch information, and a display controller for controlling the image displayed by the display unit on the basis of the shape change.

14. The stretchable display as claimed in claim 13, wherein the acceleration sensors are provided at at least two corners from among corners formed by adjacent edges of the stretchable substrate.

15. The stretchable display as claimed in claim 14, further comprising:

an acceleration obtaining unit for obtaining each acceleration of the at least two corners using the at least two acceleration sensors; and a moving distance obtaining unit for obtaining each moving distance of the at least two corners using the accelerations, wherein the stretch information obtaining unit obtains the stretch information of the stretchable substrate using each of the moving distances of the at least two corners.

16. The stretchable display as claimed in claim 14, wherein the at least two corners are adjacent to each other, and an extension line connecting the at least two corners extends in a first direction, and the stretch information obtaining unit obtains the stretch information in the first direction.

17. The stretchable display as claimed in claim 14, wherein the at least two corners are not adjacent to each other, and an extension line connecting the at least two corners extends in a third direction, and the stretch information obtaining unit obtains the stretch information in the third direction.

18. The stretchable display as claimed in claim 14, wherein:

the acceleration sensors are provided at at least four corners from among the corners, and the stretch information obtaining unit obtains the stretch information of the stretchable substrate using the acceleration sensors provided at the at least four corners.

19. The stretchable display as claimed in claim 18, wherein:

the edges are disposed in a first direction or a second direction, and the stretch information obtaining unit obtains stretch information candidates in the first direction or in the second direction of the stretchable substrate using two respective pairs of the acceleration sensors, which are adjacent to each other from among the acceleration sensors, and obtains the stretch information of the stretchable substrate using the stretch information candidates.

20. The stretchable display as claimed in claim 18, wherein an extension line connecting two corners, which are not adjacent to each other from among the four corners, lies in a third direction or in a fourth direction, and the stretch information obtaining unit obtains stretch information candidates in the third direction or in the fourth direction of the stretchable substrate using two respective pairs of the acceleration sensors, which are not adjacent to each other among the acceleration sensors, and obtains the stretch information of the stretchable substrate using the stretch information candidates.

21. The method as claimed in claim 1, wherein controlling the image displayed by the display unit includes one or more of controlling a size of the image on the basis of the shape change, controlling a luminance of the image on the basis of the shape change, controlling a resolution of the image on the basis of the shape change, controlling a user interface on the basis of the shape change, or controlling a user experience design on the basis of the shape change.

22. The stretchable display as claimed in claim 12, wherein controlling the image displayed by the display unit includes one or more of controlling a size of the image on the basis of the shape change, controlling a luminance of the image on the basis of the shape change, controlling a resolution of the image on the basis of the shape change, controlling a user interface on the basis of the shape change, or controlling a user experience design on the basis of the shape change.

* * * * *